(No Model.)
G. C. SAVAGE.
BICYCLE CHAIN ADJUSTMENT.
No. 602,545. Patented Apr. 19, 1898.
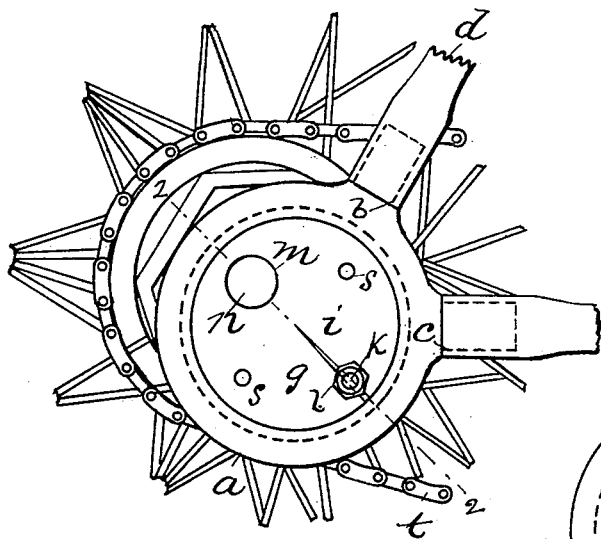
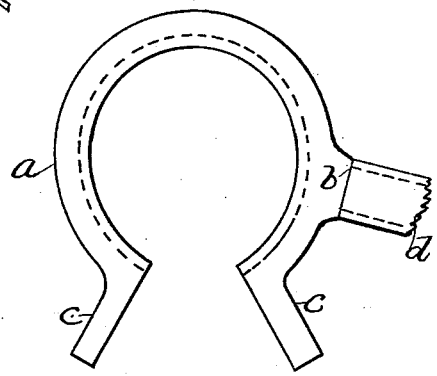
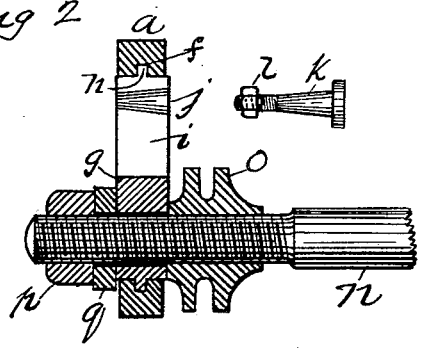
WITNESSES:
INVENTOR
Geo. C. Savage
BY
A. P. Thayer
ATTORNEY

UNITED STATES PATENT OFFICE.

GEORGE C. SAVAGE, OF NEW YORK, N. Y., ASSIGNOR TO THE BERNSON MANUFACTURING COMPANY, OF SAME PLACE.

BICYCLE-CHAIN ADJUSTMENT.

SPECIFICATION forming part of Letters Patent No. 602,545, dated April 19, 1898.

Application filed April 29, 1897. Serial No. 634,490. (No model.)

*To all whom it may concern:*

Be it known that I, GEORGE C. SAVAGE, a citizen of the United States, and a resident of New York city, in the county and State of New York, have invented certain new and useful Improvements in Bicycle-Chain-Adjusting Apparatus, of which the following is a specification.

My invention consists of disks tongued and grooved in solid-ring terminals of the hind part of the frame, in which disks the axle is mounted eccentrically, said disks being split to a certain extent radially and provided with a taper expanding-pin with a nut screwed on the small end of the pin for tightening the disks in the rings to hold them when adjusted. The rings are parted through one of the lugs for joining one of the frame-tubes and opened to insert the disks and then closed and brazed solid and connected with the frame-tube by being inserted and brazed therein, as usual, with the disks permanently confined, but free to turn when not expanded by the taper-screw, as hereinafter described, reference being made to the accompanying drawings, in which—

Figure 1 is a side elevation of part of the hind gear of a bicycle constructed with my improved chain-adjusting apparatus. Fig. 2 is a section of the same on line 2 2 of Fig. 1; and Fig. 3 is a side view of one of the ring-terminals of the frame, parted through one of the frame-connecting lugs and opened for inserting a disk.

In the first place I provide a solid ring $a$ with lugs $b$ and $c$ for connecting with the frame-tubes $d$ and $e$, preferably by punching it out of a sheet of steel, then turn the groove $f$ in the inner periphery of the ring and part the ring through one of the lugs and open it, as shown in Fig. 3, and insert the disk $g$, having a tongue $h$ for retaining it in the ring when closed, and then close the ring on the disk and braze it solid again, as shown in Fig. 1, making the disk fit so as to turn freely in the ring when so closed and brazed, and in the disk I make a radial slit $i$, extending to the center, or thereabout, which is traversed by a taper-bore $j$, in which is fitted a taper expanding-pin $k$, having a nut $l$ screwed on the small end for forcing the pin in and expanding the disk tight in the ring. The lugs are then inserted in the ends of the frame-tubes $d$ and $e$ and brazed therein, as usual.

The disks are bored eccentrically, as at $m$, for reception of the axle $n$, which is clamped therein by the cone $o$, nut $p$, and washer $q$, and said disks have perforations $s$ for application of a spanner for shifting the axle to adjust the chain $t$. When the axle is rigidly clamped in both disks, a spanner applied to one disk will shift both alike and the alinement of the wheel will not be altered.

It will be seen that the solid ring avoids the lugs necessary when the parted ring is used with a clamping device for gripping the disk and is therefore much neater and also stronger.

It is to be noticed that my invention relates to apparatus for shifting the hind-wheel axle forward and backward in the hind forks of the frame for adjusting the chain, in which the conditions generally are essentially different from the conditions of those contrivances in which the crank-axle is shifted in the crank-hanger for the same purpose, and therefore eccentric adjusting devices, in some respects applicable generally in both localities, must be materially different in various particulars of construction to meet the different conditions, and it is on such specially-different features of construction that I base my claim.

I claim—

In a hind-wheel bicycle-chain-adjusting device, the combination of solid-ring terminals of the hind-fork frames, an expanding disk tongued and grooved in each terminal, and means for expanding the disks within the terminals, the axle being mounted eccentrically in said disks substantially as described.

Signed at New York city, in the county and State of New York, this 8th day of April, A. D. 1897.

GEO. C. SAVAGE.

Witnesses:
W. J. MORGAN,
A. P. THAYER.